US011215252B2

(12) United States Patent
Ruiz et al.

(10) Patent No.: US 11,215,252 B2
(45) Date of Patent: Jan. 4, 2022

(54) WHEEL END BRAKE PAD WEAR SENSOR

(71) Applicant: Bendix Spicer Foundation Brake LLC, Elyria, OH (US)

(72) Inventors: Javier A. Ruiz, Lakewood, OH (US); Scott Purgason, North Olmsted, OH (US); Adam P. Jones, Cleveland, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 423 days.

(21) Appl. No.: 16/369,634

(22) Filed: Mar. 29, 2019

(65) Prior Publication Data

US 2020/0309217 A1 Oct. 1, 2020

(51) Int. Cl.
*F16D 65/12* (2006.01)
*F16D 66/02* (2006.01)

(52) U.S. Cl.
CPC .......... *F16D 66/027* (2013.01); *F16D 65/12* (2013.01)

(58) Field of Classification Search
CPC ............................... F16D 65/12; F16D 66/027
USPC .............. 188/1.11 R, 1.11 L, 1.11 W, 1.11 E
See application file for complete search history.

(56) References Cited

U.S. PATENT DOCUMENTS

| | | | |
|---|---|---|---|
| 5,848,672 A | 12/1998 | Brearley et al. | |
| 6,129,183 A * | 10/2000 | Ward | F16D 65/183 188/1.11 L |
| 6,276,494 B1 * | 8/2001 | Ward | F16D 65/183 188/1.11 L |
| 6,457,566 B1 | 10/2002 | Toby | |
| 6,696,937 B1 | 2/2004 | Kiefer | |
| 7,373,224 B2 | 5/2008 | Goetz et al. | |
| 8,310,356 B2 | 11/2012 | Evans et al. | |
| 8,717,159 B2 | 5/2014 | Todd et al. | |

(Continued)

FOREIGN PATENT DOCUMENTS

| | | |
|---|---|---|
| CN | 100480533 C | 4/2009 |
| CN | 102229337 B | 2/2013 |

(Continued)

OTHER PUBLICATIONS

International Search Report issued in corresponding International (PCT) Patent Application No. PCT/US2020/024546 (dated Jun. 12, 2020).

(Continued)

*Primary Examiner* — Vishal R Sahni
(74) *Attorney, Agent, or Firm* — Reising Ethington P.C.

(57) ABSTRACT

A sensor assembly for determining an amount of wear on a brake pad in a disc brake includes a shaft extender having a first end coupled to one end of a shaft of an adjustment mechanism of a caliper of the disc brake for rotation with the shaft about a rotational axis and a second end defining a shaft extension. A sensor generates a signal indicative of a degree of rotation of the shaft extension with the signal indicative of the amount of wear on the brake pad. The sensor includes a body coupled to the shaft extension and configured for rotation about an offset axis offset from the rotational axis in response to rotation of the shaft extension about the rotational axis and a measurement device configured to generate the signal responsive to rotation of the body about the offset axis. A housing encloses the sensor.

19 Claims, 8 Drawing Sheets

(56) References Cited

U.S. PATENT DOCUMENTS

| | | | |
|---|---|---|---|
| 8,752,422 B2* | 6/2014 | Helf | F16D 66/026 |
| | | | 73/121 |
| 9,279,468 B1 | 3/2016 | Philpott | |
| 9,447,832 B2 | 9/2016 | Todd et al. | |
| 9,482,301 B2 | 11/2016 | Lamkin et al. | |
| 9,618,067 B2 | 4/2017 | Philpott | |
| 9,746,043 B2 | 8/2017 | Asen et al. | |
| 9,890,826 B2 | 2/2018 | Staahl et al. | |
| 9,964,166 B2 | 5/2018 | Staahl et al. | |
| 10,047,814 B2 | 8/2018 | Kinkley | |
| 10,063,837 B2 | 8/2018 | Zoken et al. | |
| 2008/0190712 A1 | 8/2008 | Hagberg | |
| 2011/0155518 A1 | 6/2011 | Iraschko | |
| 2017/0067522 A1 | 3/2017 | Banks et al. | |
| 2017/0372532 A1 | 12/2017 | Merg et al. | |
| 2017/0372533 A1 | 12/2017 | Merg et al. | |
| 2018/0031066 A1 | 2/2018 | Lin et al. | |
| 2018/0106320 A1 | 4/2018 | Lin et al. | |
| 2018/0223935 A1 | 8/2018 | Eden | |

FOREIGN PATENT DOCUMENTS

| | | |
|---|---|---|
| CN | 206487806 U | 9/2017 |
| CN | 107878431 A | 4/2018 |
| CN | 108194543 A | 6/2018 |
| DE | 3300446 A1 | 7/1984 |
| DE | 10 2010 032 515 A1 | 2/2012 |
| DE | 10 2012 102 582 A1 | 9/2013 |
| DE | 102013013280 B3 | 2/2015 |
| DE | 10 2015 013 240 A1 | 4/2017 |
| DE | 102017002148 A1 | 9/2017 |
| EP | 0 789 156 A1 | 8/1997 |
| EP | 0670972 B1 | 3/2000 |
| EP | 0789156 B1 | 6/2001 |
| EP | 3023667 A1 | 5/2016 |
| EP | 2 817 530 B1 | 4/2017 |
| GB | 2 310 015 A | 8/1997 |
| JP | 2009-168210 A | 7/2009 |
| WO | 2018/026745 A1 | 2/2018 |
| WO | 2018/049301 A1 | 3/2018 |
| WO | 2018/050564 A1 | 3/2018 |
| WO | 2018/075352 A1 | 4/2018 |
| WO | 2018/075439 A1 | 4/2018 |

OTHER PUBLICATIONS

Written Opinion issued in corresponding International (PCT) Patent Application No. PCT/US2020/024546 (dated Jun. 12, 2020).
U.S. Department of Transportation Federal Aviation Administration, "Sensory Prognostics and Management Systems (SPMS)" (Jun. 2013).
Sensata Technologies, "Brake Pad Wear Sensor" (https://propertibazar.com/article/brake-pad-wear-sensata-technologies_5a50dd05d64ab27bb9d4912f.html).
D'Orazio, Leandro et al., "Field Trials and Assessment for Automotive Application" (2011).
Babcox Media, Inc., "Brake Pad Wear Sensors," (Jun. 7, 2016).
Bavarian Autosport, "When Should BMW and MINI Brake Rotors, Disc, be Replaced?" (Nov. 22, 2016).
American Public Transportation Association, "Disc Brake Wheels on Inspection," (Jan. 26, 2017).
PedrosGaragae, "Brake Pad & Rotor Replacement," (http://www.pedrosgarage.com/Site_3/Replace_Brake_Pads_%26_Rotors.html).
American Public Transportation Association, "Transit Bus S-Cam Brake Reline" (2014).
Haldex AB, "The Brakes Must be Able to Manage all Possible Situations," (2006).
BPW Bergische Achsen K.G., "Workshop Manual—BPW Trailer Axles With Drum Brakes," (May 1, 2016).
Knorr-Bremse Systeme fur Nutzfahrzeuge Gmbh,"Service Manual—Pneumatic Disc Brake SN6-SN7-SK7" (Mar. 2013).
Bendix Spicer Foundation Brake LLC, "Service Data SD-23-7541 Bendix ADB22X, ADB22X-V Air Disc Brakes" (2012).
English (machine) translation of CN 100480533 C.
English (machine) translation of CN 102229337 B.
English (machine) translation of CN 107878431 A.
English (machine) translation of CN 108194543 A.
English (machine) translation of CN 206487806 U.
English (machine) translation of DE 3300446 A1.
English (machine) translation of DE 102013013280 B3.
English (machine) translation of DE 102017002148 A1.
English (machine) translation of JP 2009-168210 A.
English (machine) translation of DE 10 2010 032 515 A1.
English (machine) translation of DE 10 2012 102 582 A1.
English (machine) translation of DE 10 2015 013 240 A1.

* cited by examiner

WHEEL END BRAKE PAD WEAR SENSOR

BACKGROUND OF THE INVENTION a. Field of the Invention

This invention relates to vehicle brakes. In particular, the invention relates to a sensor assembly for determining an amount of wear on a brake pad in a vehicle disc brake and a method of assembling the sensor assembly to the disc brake.

b. Background Art

A conventional disc brake includes a brake pad carrier that is configured to be affixed to a vehicle wheel assembly. The carrier supports brake pads that are disposed on opposite sides of a rotor of the wheel assembly. The disc brake further includes a caliper that is mounted on the carrier. The caliper has a body with portions disposed on both sides of the rotor. A brake actuator is mounted on the caliper body. Movement of the brake actuator causes movement of an actuating mechanism housed within an inboard portion of the caliper body towards an inboard brake pad to force the brake pad against the inboard side of the rotor. The same movement of the brake actuator causes movement of the caliper body in a second direction—opposite the direction of movement of the actuating mechanism—to bring an outboard portion of the caliper body into engagement with an outboard brake pad and to force the brake pad against the outboard side of the rotor.

Over time, the brake pads in a disc brake experience wear. Unless the position of the brake pads is adjusted to compensate for this wear, the distance between the brake pads and the rotor will increase. This increase in distance increases the force required to apply the brake and the time required to apply the brake. Therefore, conventional disc brakes include a mechanism to automatically adjust the position of the brake pads in response to wear. It is beneficial to know the extent of brake pad wear for safe operation of the vehicle and scheduling maintenance among other reasons. In disc brakes employing automatic adjustment of the brake pad position, the extent of brake pad wear is not always apparent to the vehicle operator. Therefore, brake pad wear sensors have been developed to provide an indication of brake pad wear to the vehicle operator and others. Some conventional sensors are embedded in the brake pads and generate an audible noise or electric signal when the brake pad wears to a point where the sensor contacts the rotor. These sensors must be discarded and replaced, however, each time a brake pad wears through. Other conventional sensors sense a change in position of one or more components of the brake that can evidence wear on the brake pads. Some of these position sensors are mounted proximate the brake pads and are difficult to install and subject to damage. Other position sensors sense the position of a component distant from the brake pads, such as the mechanism used to adjust the position of the brake pads following wear. These sensors, however, are typically integrated into the caliper. As a result, a failure of the sensor requires difficult repair or replacement of the entire caliper. In addition, it is not possible for a vehicle operator to retrofit existing calipers to incorporate such sensors.

The inventors herein have recognized a need for a sensor assembly for determining an amount of wear on a brake pad in a vehicle disc brake that will minimize and/or eliminate one or more of the above-identified deficiencies.

BRIEF SUMMARY OF THE INVENTION

This invention relates to vehicle brakes. In particular, the invention relates to a sensor assembly for determining an amount of wear on a brake pad in a vehicle disc brake and a method of assembling the sensor assembly to the disc brake.

A sensor assembly for determining an amount of wear on a brake pad in a disc brake in accordance with one embodiment includes a shaft extender including a first end configured for coupling to one end of a shaft of an adjustment mechanism of a caliper of the disc brake for rotation with the shaft about a rotational axis. A second end of the shaft extender defines a shaft extension. The sensor assembly further includes a sensor configured to generate a signal indicative of a degree of rotation of the shaft extension. The signal is indicative of the amount of wear on the brake pad. The sensor includes a body coupled to the shaft extension and configured for rotation about an offset axis offset from the rotational axis in response to rotation of the shaft extension about the rotational axis. The sensor further includes a measurement device configured to generate the signal responsive to rotation of the body about the offset axis. The sensor assembly further includes a housing configured to enclose the sensor.

A method of assembling a sensor assembly for determining an amount of wear on a brake pad in a disc brake to the disc brake in accordance with one embodiment includes the step of rotating a shaft of an adjustment mechanism of a caliper of the disc brake about a rotational axis to position the shaft at a predetermined position. The method further includes the step of removing a shear adapter from a first end of the shaft. The method further includes the step of aligning the sensor assembly with the disc brake. The sensor assembly includes a shaft extender including a first end configured for coupling to one end of the shaft of the adjustment mechanism for rotation with the shaft about the rotational axis and a second end defining a shaft extension. The sensor assembly further includes a sensor configured to generate a signal indicative of a degree of rotation of the shaft extension. The signal is indicative of the amount of wear on the brake pad. The sensor includes a body coupled to the shaft extension and configured for rotation about an offset axis offset from the rotational axis in response to rotation of the shaft extension about the rotational axis and a measurement device configured to generate the signal responsive to rotation of the body about the offset axis. The sensor assembly further includes a housing configured to enclose the sensor. The method further includes the step of moving the sensor assembly along the rotational axis relative to the caliper such that the shaft extender of the sensor assembly is coupled to the one end of the shaft of the adjustment mechanism.

A sensor assembly for determining an amount of wear on a brake pad in a disc brake and method for assembling the sensor assembly to the disc brake in accordance with the invention represents an improvement as compared to conventional brake pad wear sensors and assembly methods. Unlike conventional sensors that are embedded in brake pads, a sensor in accordance with the present disclosure does not require replacement each time the brake pad is replaced. Further, unlike conventional position sensors, a sensor in accordance with the present disclosure is mounted in a location where damage is less likely to occur and is configured in such a way that the sensor can be easily accessed for repair or replacement and can be installed on existing brake calipers.

The foregoing and other aspects, features, details, utilities, and advantages of the present invention will be apparent from reading the following description and claims, and from reviewing the accompanying drawings.

DETAILED DESCRIPTION OF THE INVENTION

Figure 1:
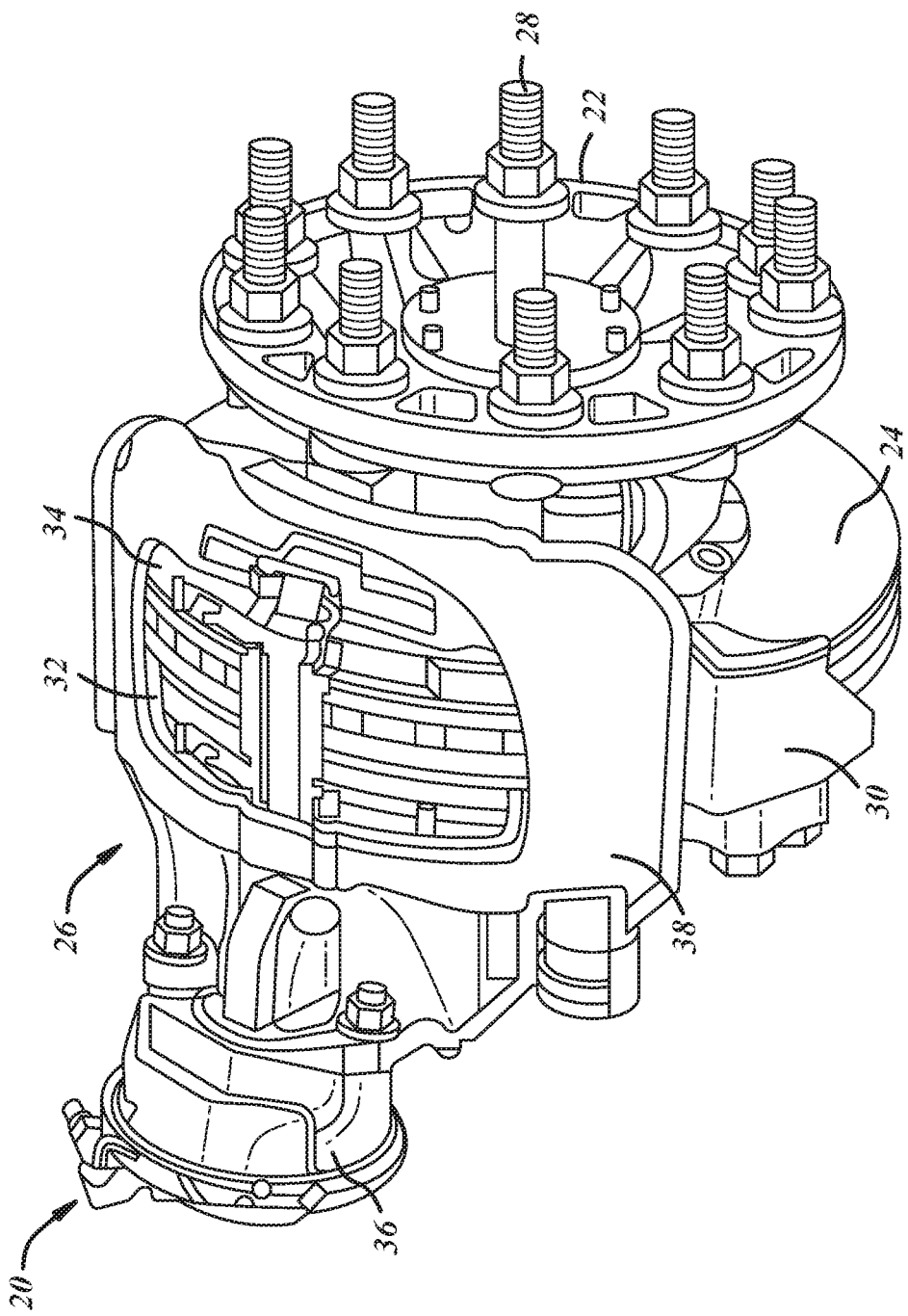
FIG. 1 is a perspective view of a disc brake in accordance with one embodiment of the present teachings mounted on a vehicle wheel end assembly.

Referring now to the drawings wherein like reference numerals are used to identify identical components in the various views, FIG. 1 illustrates a wheel end assembly 20 incorporating a disc brake in accordance with one embodiment of the present teachings. Assembly 20 is particularly configured for use on heavy commercial vehicles such as trucks, trailers and buses, but it should be understood that assembly 20 may find application on a wide variety of vehicles. Assembly 20 may include a wheel hub 22, a rotor 24 and a disc brake 26.

Wheel hub 22 is provided for mounting a vehicle wheel on an axle of the vehicle. In the illustrated embodiment, hub 22 is configured for use with a steer axle of the vehicle. It should be understood, however, that hub 22 may alternatively be configured for use with a drive axle or trailer axle. Hub 22 may define a central bore configured to receive a stub axle and bearings that allow hub 22 to rotate relative to the axle. Hub 22 also includes a plurality of outwardly extending bolts 28 on which the wheel may be mounted for rotation with hub 22.

Rotor 24 works together with brake 26 to establish a braking torque in a vehicle wheel in order to slow or stop rotation of the wheel and movement of the vehicle. Rotor 24 may be made from a variety of metals and metal alloys including iron. Rotor 24 is annular in shape and configured for mounting on wheel hub 22. Rotor 24 may be secured to hub 22 using conventional fasteners. Alternatively, rotor 24 may define a plurality of splines in a radially inner perimeter configured to engage mating splines on a radially outer mounting surface of hub 22. Additional hardware including spacers and fasteners may be used to maintain the position of rotor 24 on hub 22. Rotor 24 transmits a braking torque to hub 22 which in turn transmits the torque to the vehicle wheel. Rotor 24 may include a pair of braking discs connected by webs to increase the surface area of the rotor for use in dissipating heat from the rotor generated during braking into the air and thereby minimize heat distortion and optimize thermal stress endurance.

Disc brake 26 is provided to apply a braking torque to rotor 24 in order to slow or halt rotation of one or more vehicle wheels. Disc brake 26 is particularly adapted for use on heavy vehicles and may be used with wheels mounted on drive axles, steer axles or trailer axles. It should be understood, however, that brake 26 could be used on a wide variety of vehicles and in non-vehicular applications. Brake 26 includes a brake pad carrier 30, brake pads 32, 34, an actuator 36 and a caliper 38. In accordance with the present teachings, brake 26 may further include a sensor assembly for determining an amount of wear on brake pads 32, 34 as described in greater detail hereinbelow.

Carrier 30 is provided to support brake pads 32, 34. Carrier 30 also absorbs circumferential loads during actuation of brake 26 and transfers those loads to the axle through an anchor plate (not shown) on which carrier 30 is mounted and through which the axle extends. Carrier 30 has a body that is configured to support brake pads 32, 34 and to locate brake pads 32, 34 on inboard and outboard sides of rotor 24.

Brake pads 32, 34 are provided to generate friction during engagement with rotor 24 in order to slow the rotation of rotor 24 and, ultimately, the vehicle wheel. Brake pads 32, 34 are supported on carrier 30 with brake pad 32 disposed on an inboard side of rotor 24 and brake pad 34 disposed on an outboard side of rotor 24. Each brake pad 32, 34 may include a friction material configured to engage rotor 24, a backing plate that supports the friction material and is engaged by an actuating mechanism of the brake and a bonding material that couples the friction material to the backing plate. Brake pads 32, 34 may be retained on carrier 30 using springs (not shown).

Actuator 36 is provided to control actuation of brake 26. In the illustrated embodiment, actuator 36 comprises a pneumatic service actuator. It should be understood, however, that actuator 36 may take on a variety of forms including actuators that are configured to operate brake 26 as both a parking and service brake. Actuator 36 may include a pushrod (not shown) that moves along an axis in response to forces generated by springs and fluid pressure in order to transmits force to caliper 38 in order to apply or release brake 26.

Figure 2:
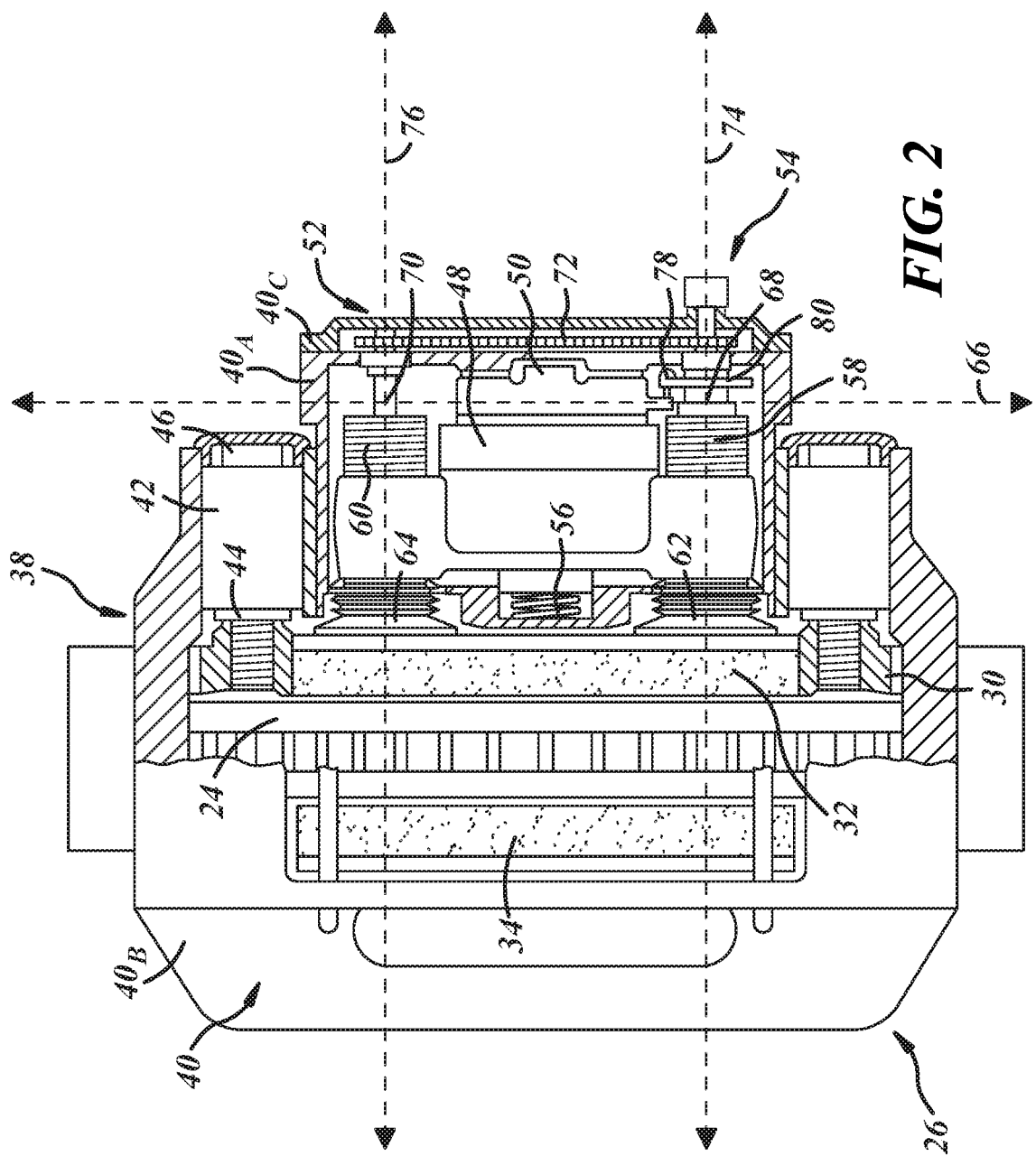
FIG. 2 is a partial cross-sectional view of a portion of the disc brake of FIG. 1.
Figure 3:
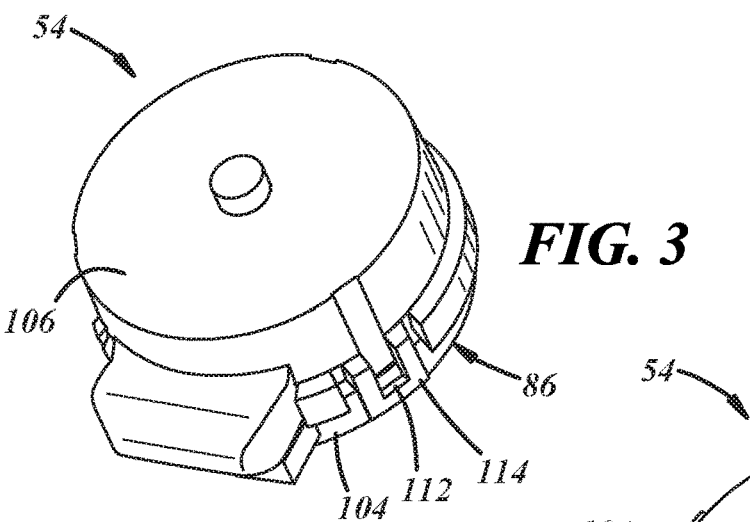
FIGS. 3-4 are perspective views of one embodiment of a wear sensor assembly for determining an amount of wear on a brake pad of the disc brake of FIGS. 1-2.

Caliper 38 is provided urge brake pads 32, 34 into engagement with rotor 24 in response to movement of the pushrod in actuator 36 to an applied position. Referring to FIG. 2, caliper 38 includes a body 40 and means, such as bushings 42, guide pins 44, and fasteners 46, for coupling caliper 38 to carrier 30 and permitting movement of caliper 38 relative to carrier 30. Caliper 38 further includes, means, such as bridge 48 for urging inboard brake pad 32 towards the inboard side of rotor 24, and means, such as lever 50, for causing movement of bridge 48 and body 40 in response to movement of the actuator pushrod. Caliper 38 further includes means, such as adjustment mechanism 52, for adjusting the position of brake pads 32, 34 in order to compensate for wear on brake pads 32, 34 and maintain brake stroke. In accordance with the present teachings, caliper 38 also includes a sensor assembly 54 for determining an amount of wear on brake pads 32, 34 as described in greater detail hereinbelow Body 40 provides structural support for the other components of caliper 38 and protects those components from foreign objects and elements. Body 40 also provides a means for urging outboard brake pad 34 against the outboard side of rotor 24. In the illustrated embodiment, body 40 includes several members 40A, 40B, 40c that may be coupled together using conventional fasteners such as screws, bolts, welds or adhesives. Member 40A of body 40 is disposed on the inboard side of rotor 24 and houses bridge 48, lever 50 and other components used to urge brake pad 32 against rotor 24. Member 40A is also configured to support brake actuator 36 and defines a bore through which the pushrod of actuator 36 extends to contact lever 50. In response to movement of lever 50 by actuator 36 during application of brake 26, bridge 48 is moved to the left in FIG. 2 and urges inboard brake pad 32 towards the inboard side of rotor 24 and into engagement with the inboard side of rotor 24. Member 40B is coupled to member 40A and a portion of member 40B is disposed on the outboard side of rotor 24. In response to movement of lever 50 by actuator 36 during application of brake 26, body 40 is moved to the right in FIG. 2 and member 40B urges outboard brake pad 34 towards the outboard side of rotor 24 and into engagement with the outboard side of rotor 24. Member 40c is coupled to member 40A and acts as a cover for certain components of adjustment mechanism 52.

Bushings 42, guide pins 44 and bolts 46 provide a means for coupling caliper 38 to carrier 30 and permitting movement of caliper 38 relative to carrier 30. Member 40B of body 40 of caliper 38 defines bores that are aligned with bores in carrier 30 in a direction parallel to the rotational axis of the vehicle wheel and that are configured to receive bushings 42, guide pins 44 and fasteners 46 therein. Guide pins 44 extend through the bores and bushings 42 and engage a face of carrier 30 which is shaped to receive one longitudinal end of each pin 44. Each pin 44 has a counterbored hole that aligns with a corresponding bore in carrier 30 and fasteners 46 are inserted into the counterbored holes and the aligned bores in carrier 30 to secure pins 44 against carrier 30. Bushings 42 are disposed about pins 44 within the bores in member 40B of caliper body 40 and allow body 40 to move relative to carrier 30 in a direction parallel to the rotational axis of the vehicle wheel.

Bridge 48 provides a means for urging inboard brake pad 32 towards the inboard side of rotor 24. One end of bridge 48 is coupled to lever 50 and bridge 48 is configured to move in response to movement of lever 50 caused by movement of the pushrod of actuator 36. Bridge 48 may define a bore at an opposite end configured to receive a return spring 56 that is disposed between opposed spring seats in bridge 48 and a wall of member 40A of caliper body 40. Spring 56 biases bridge 48 away from inboard brake pad 32 when brake 26 is released. Bridge 48 defines bores at either circumferential end configured to received threated tubes 58, 60 that support tappets 62, 64, respectively, on one end and that are configured to received certain components of adjusting mechanism 52 therein. Tubes 58, 60 extend outward from bridge 48 and through openings in member 40A of caliper body 40 such that tappets 62, 64 engage inboard brake pad 32 when brake 26 is applied.

Lever 50 provides a means to cause movement of bridge 48 and caliper body 40 in response to movement of the pushrod of actuator 36 and to multiply the force of actuator 36. Lever 50 is disposed within member 40A of body 40. One end of lever 50 is configured to receive one end of the pushrod of actuator 36 and may define a semi-hemispherical recess for receiving the end of the pushrod in some embodiments. The opposite end of lever 50 is configured to engage bridge 48. A portion of lever 50 is supported on an eccentric bearing (not shown) located on an internal surface of member 40A of body 40 opposite bridge 48. The bearing minimizes friction and hysteresis and lever 50 pivots on the bearing about axis 66. During application of brake 26, the pushrod of actuator 36 extends further into member 40A of caliper body 40. The extension of the pushrod causes movement of lever 50 which in turn urges bridge 48, and tappets 62, 64, in a first direction (to the left in FIG. 2) to force inboard brake pad 32 towards the inboard side of rotor 24. The same action forces caliper body 40 in a second, opposite direction (to the right in FIG. 2) to bring member 40B of body 40 into engagement with outboard brake pad 34 and force outboard brake pad 34 towards the outboard side of rotor 24.

Adjustment mechanism 52 provides a means for adjusting the position of brake pads 32, 34 in order to compensate for wear on brake pads 32, 34 and maintain brake stroke. Adjustment mechanisms are conventional in the art and exemplary adjustment mechanisms are shown in U.S. Pat. No. 7,926,626 B2 and U.S. Pub. No. 2011/0155518 A1, the entire disclosures of which are incorporated herein by reference. Therefore, adjustment mechanism 52 will not be described in detail herein. Among other components, mechanism 52 includes an adjuster shaft 68, a follower shaft 70 and means, such as chain 72, for synchronizing rotation of shafts 68, 70. One end of each shaft 68, 70 is disposed within a corresponding tube 58, 60 in bridge 48 of caliper 38 and is coupled to the tube 58, 60, for rotation therewith about axes 74, 76. The opposite end of each shaft 68, 70 projects from the corresponding tube 58, 60 and supports a chain wheel or sprocket. Chain 72 is disposed on the chain wheels or sprockets such that rotation of adjuster shaft 68 and tube 58 results in corresponding rotation of follower shaft 70 and tube 60. Lever 50 include a pin 78 disposed within a shifting fork 80 disposed about adjuster shaft 68. In the event of wear on brake pads 32, 34, the movement of lever 50 and pin 78 as the brake is applied will cause the adjustment mechanism, through movement of shift fork 80, to rotate adjuster shaft 68 and tube 58 (and, consequently, follower shaft 70 and tube 60) in order to reposition brake pads 32, 34 and maintain a constant gap between brake pads 32, 34 and rotor 24.

As noted hereinabove, caliper 38 may further include a wear sensor assembly 54 for determining an amount of wear on a brake pad 32, 34 in brake 26. Referring now to FIGS. 3-6, one embodiment of a wear sensor assembly 54 in accordance with the present teachings is illustrated. Assembly 54 is configured to determine an amount of wear pad on brake pads 32, 34 responsive to rotation of one of shafts 68, 70 in adjustment mechanism 52. Because shafts 68, 70 rotate to reposition brake pads 32, 34 when wear occurs, rotation of shafts 68, 70 is indicative of the amount of wear on brake pads 32, 34. In certain embodiments, sensor assembly 54 may be configured to be installed on caliper 38 in place of an existing cap or cover for adjuster shaft 68 that is removed to facilitate access to adjuster shaft 68 for manual rotation of shaft 68 to back off tappets 62, 64 when replacing brake pads 32, 34. Sensor assembly 54 includes a shaft extender 82, a sensor 84, and a housing 86.

Figure 4:
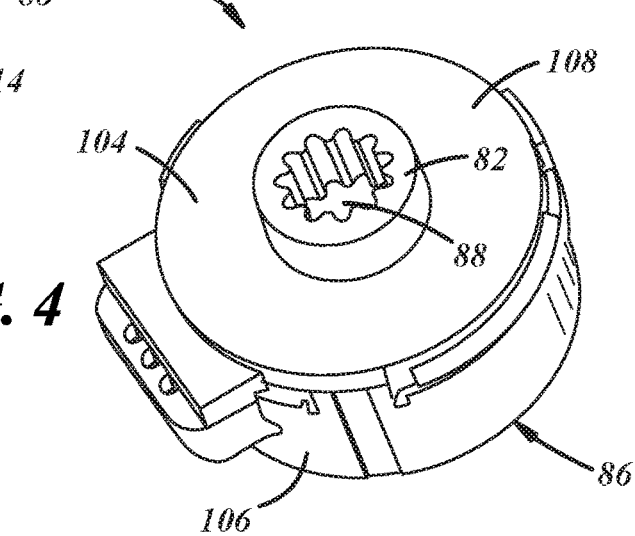

Referring to FIG. 4, shaft extender 82 provides an extension of a shaft, such as adjuster shaft 68, in adjustment mechanism 52. Extender 82 is also configured to support components of sensor 84 and housing 86. One end of extender 82 is configured for coupling to one end of shaft 68. Although sensor assembly 54 is positioned such that extender 82 is coupled to one end of adjuster shaft 68 in the illustrated embodiment, it should be understood that sensor assembly 54 could alternatively be positioned such that extender 82 is coupled to follower shaft 70. In the illustrated embodiment, extender 82 defines a recess 88 that is configured to receive an end of shaft 68. Recess 88 is configured to couple extender 82 to shaft 68 for rotation therewith about axis 74. Recess 88 may define a plurality of splines configured to engage corresponding splines on shaft 68. It should be understood, however, that recess 88 and the end of shaft 68 may be configured in a variety of complementary ways to couple extender 82 to shaft 68 for rotation about axis 74. The other end of extender 82 defines a shaft extension 90. Extension 90 is configured to support elements of sensor 84 and housing 86. Extender 82, and extension 90, rotate with shaft 68 such that rotation of extension 90 is indicative of the rotation of shaft 68 during adjustment of brake pads 32, 34 and, therefore, wear on brake pads 32, 34.

Sensor 84 is provided to generate a signal indicative of a degree of rotation of shaft extension 90. Because rotation of shaft extension 90 is indicative of rotation of shaft 68 which rotates to adjust the position of brake pads 32, 34 in response to wear on brake pads 32, 34, the signal is indicative of an amount of wear on brake pads 32, 34. Sensor 84 includes a body coupled to shaft extension 90 and configured for rotation with shaft extension 90 about axis 74 and a measurement device configured to generate the signal responsive to rotation of the body. In accordance with one embodiment, sensor 84 comprises a potentiometer in which the body rotating with shaft extension 90 comprises a member of a gear set 92 and the measurement device comprises a resistive element on a printed circuit board 94 whose resistance is varied responsive to rotation of the shaft extension 90 and gear set 92. It should be understood, however, that sensor 84 may assume other forms such as a Hall effect sensor, an encoder or resolver.

Figure 5:
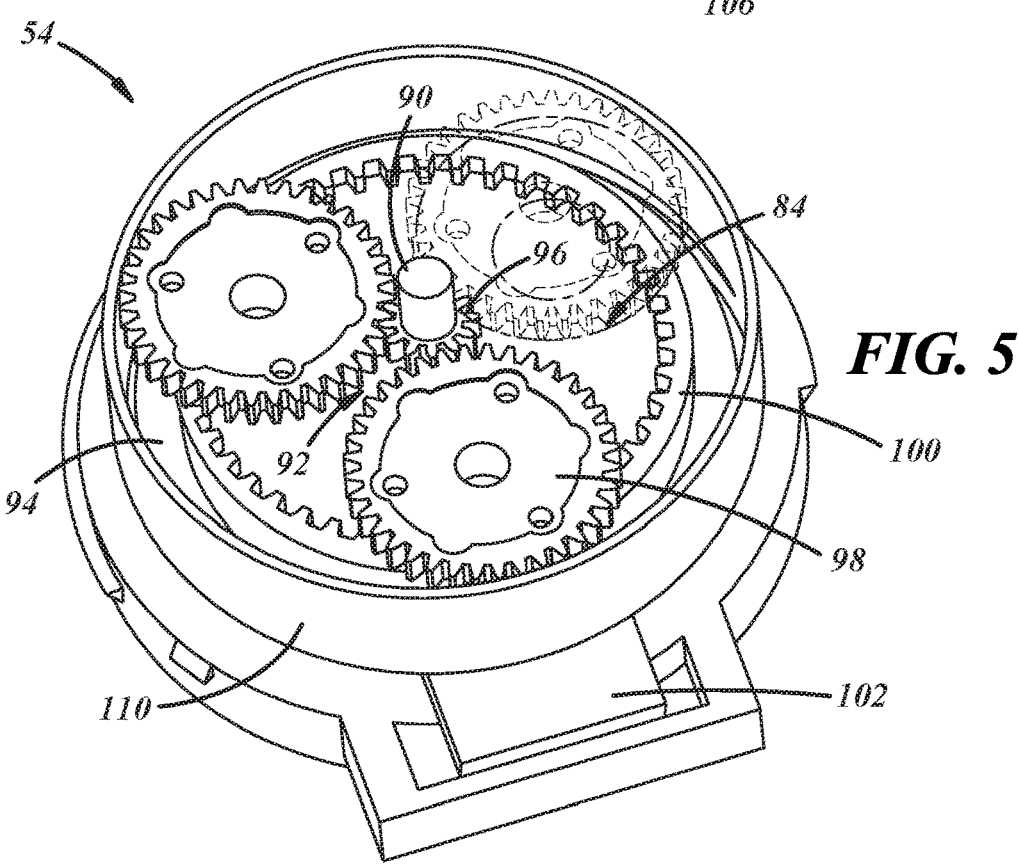
FIG. 5 is a perspective view of the wear sensor assembly of FIGS. 3-4 with one member of the housing of the sensor assembly removed.
Figure 6:
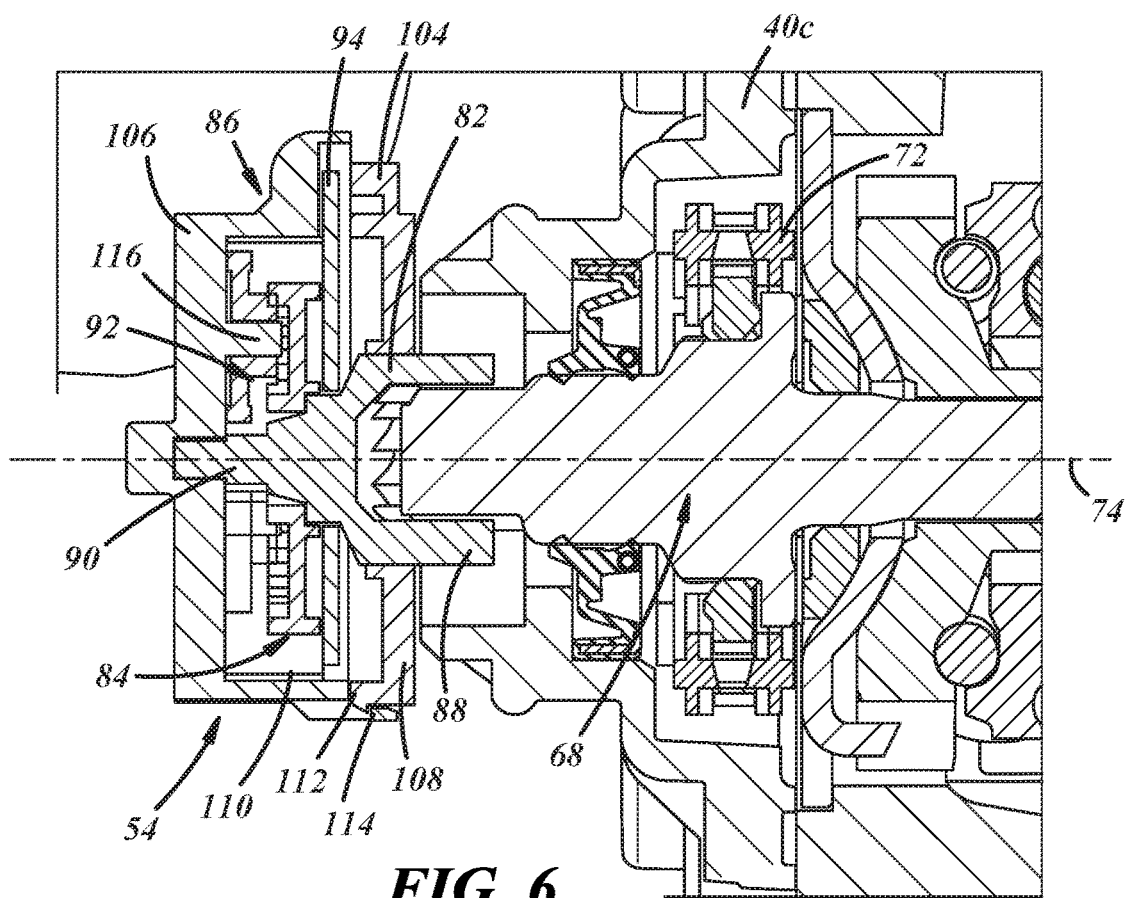
FIG. 6 is a cross-sectional view of the wear sensor assembly of FIGS. 3-5 mounted on the disc brake of FIGS. 1-2.
Figure 7:
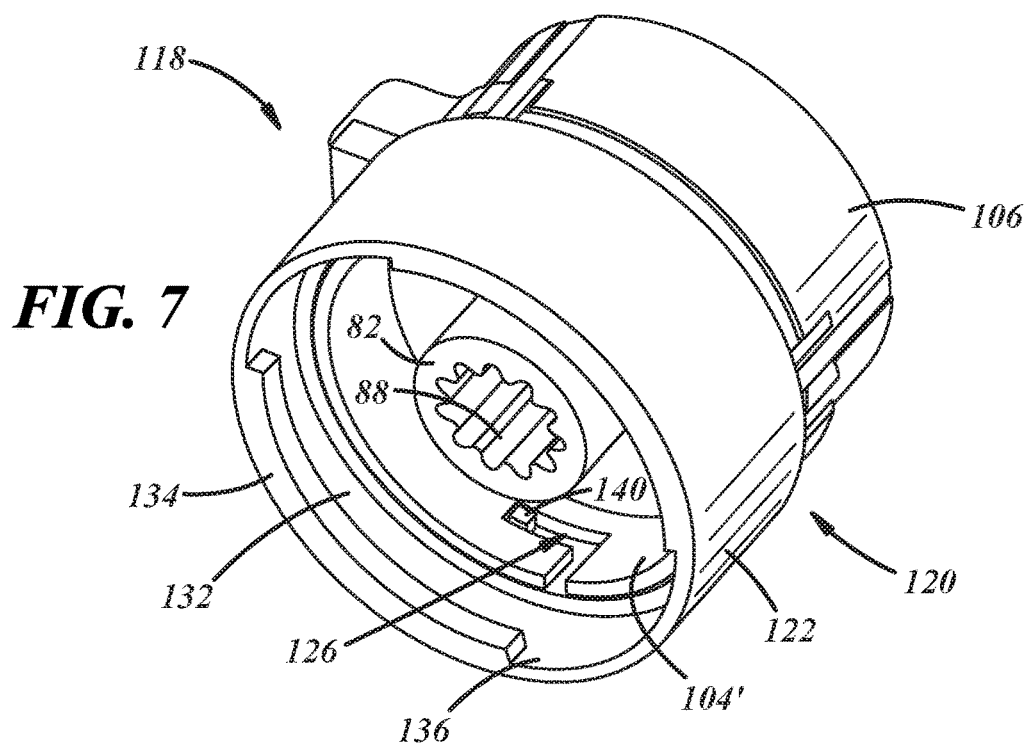
FIG. 7 is a perspective view of another embodiment of a wear sensor assembly for determining an amount of wear on a brake pad of the disc brake of FIGS. 1-2.

Gear set 92 provides a means for varying the level of resistance in the resistive element on board 94 responsive to rotation of shaft extension 90. Referring to FIG. 6, in the illustrated embodiment, gear set 92 is disposed on an outboard side of board 94 and the resistive element on board 94 (as used in connection with elements of sensor assembly 54 only, "inboard" refers to a location nearer to the end of shaft 68 and to body 40 of caliper 38 while "outboard" refers to a location further from the end of shaft 68 and body 40 of caliper 38). Referring to FIG. 5, gear set 92 may comprise a planetary gear set including a sun gear 96, a plurality of planet gears 98, and a ring gear 100. Sun gear 96 is disposed about, and coupled to, shaft extension 90 for rotation with shaft extension 90. Planet gears 98 are disposed about sun gear 96 between sun gear 96 and ring gear 100. Each planet gear 98 has an outboard portion having a first set of teeth configured to engage sun gear 96 and an inboard portion having a second set of teeth configured to engage ring gear 100. Planet gears 98 are carried by the housing 86 as described in greater detail below. Ring gear 100 is disposed about planet gears 98 and has a set of teeth in mesh with the teeth on the inboard portions of planet gears 98. Ring gear 100 is configured for rotation about axis 74 and carries a pin or similar element that is in contact with the resistive element on board 94. Ring gear 100 therefore acts as a contact member for the potentiometer. Upon rotation of adjuster shaft 68 and shaft extender 82, rotation of shaft extension 90 is transmitted through sun gear 96 and planetary gears 98 to ring gear 100 to vary the resistance of the resistive element on board 94 and thereby generate a signal indicative of the amount of wear on brake pads 32, 34.

Board 94 provides support for the resistive element and electrically connects the resistive element with other electronic components on the board 94. The resistive element may be made from a material having a known resistivity and formed into a circle or arcuate segment on board 94. End terminals of the element may be connected to other electronic components on board 94 for transmitting a signal indicative of the degree of rotation of shaft extension 90 and shaft 68 and, therefore, wear on brake pads 32, 34. In some embodiments, these components may include a connector for wires used to transmit the signal to one or more systems within a vehicle including brake control systems and operator interface systems through which information about brake pad wear may be conveyed to vehicle operators (e.g., through audio, visual, or haptic indicators). In other embodiments, the components may include a wireless transceiver configured to transmit the signal to such systems and/or to other systems remote from the vehicle. The operator interface system may, in some embodiments, permit an operator to input a value indicative of the thickness of rotor 24 following a change in brake pads 32, 34 to provide a more accurate estimate of the life of brake pads 32, 34 to the operator. In particular, wear occurs on the surfaces of rotor 24 as well as brake pads 32, 34. Absent an input indicative of the thickness of rotor 24 (and the wear on rotor 24), a wear measurement system must assume that all of the movement of adjuster shaft 68 measured by sensor assembly 54 results from wear on brake pads 32, 34 to avoid the risk of the pads 32, 34 completing wearing through. This assumption, however, means that replacement/maintenance on brake pads 32, 34 may be performed prematurely. Inputting an indication of the thickness of rotor 24 will allow systems utilizing outputs from sensor assembly 54 to determine the wear on brake pads 32, 34 with greater accuracy. Signals transmitted from board 94 (whether through wires or wirelessly) may include information sufficient to identify the particular wheel assembly on which the brake 26 is mounted to facilitate location of particular brake pads 32, 34 requiring maintenance. In the illustrated embodiment, board 94 is generally annular in shape and is configured to receive a portion of shaft extension 90 extending therethrough. Board 94 may define a radially outwardly projecting tab 102 configured to interact with housing 86 to prevent rotation of board 94 about axis 74.

Housing 86 is provided to support and orient the components of sensor 84 and to protect sensor 84 from foreign objects and elements. Housing 86 may include multiple members 104, 106. Member 104 is configured to support components of gear set 92, board 94, and components on board 94 including the resistive element. Referring to FIG. 6, member 104 includes a radially extending wall 108 that is disposed about axis 74 and through which shaft extender 90 extends. Wall 108 includes an inboard side configured to face caliper 38 and an outboard side configured to face away from caliper 38. Member 104 further includes an axially extending outboard wall 110 that extends from the radially extending wall 108 along axis 74 in an outboard direction away from caliper 38. Wall 110 varies in diameter along axis 74. Referring to FIG. 5, wall 110 defines an aperture through which tab 102 of board 94 may extend. In this manner, board 94 and member 104 of housing 86 are configured to prevent rotation of board 94 and the resistive element about axis 74 and movement of board 94 and the resistive element along axis 74. Wall 110 also defines one or more radially outwardly projecting lugs 112 for a purpose described below. Member 106 is configured to engage wall 110 of member 104 and to enclose sensor 84 on the outboard side of wall 108 of member 104. Member 106 defines one or more elastically deformable tabs 114 configured to engage lugs 112 on wall 110 of member 104. As member 106 is moved in an inboard direction along axis 74, the tabs 114 contact corresponding lugs 112. Cam surfaces on the lugs 112 cause the tabs 114 to deflect radially outward from a rest position. Upon continued movement of member 106 in the inboard direction, tabs 114 pass over lugs 112 and return to the rest position thereby inhibiting movement of member 106 of housing 86 in an outboard direction relative to member 104. Member 106 can be disengaged from member 104 by deflecting tabs 114 outwardly from the rest position so that member 106 can be moved in an outboard direction. Member 106 is also configured to carry planet gears 98 of gear set 92. Referring to FIG. 6, member 106 defines a plurality of shafts 116 that extend in an inboard direction parallel to axis 74. Each shaft 116 is configured to support one of planet gears 98.

Referring now to FIGS. 7-11, another embodiment of a wear sensor assembly 118 in accordance with the present teachings is illustrated. Like assembly 54, assembly 118 is configured to determine an amount of wear pad on brake pads 32, 34 responsive to rotation of one of shafts 68, 70 in adjustment mechanism 52. Sensor assembly 118 may again be configured to be installed on caliper 38 in place of an existing cap or cover for adjuster shaft 68 that is removed to facilitate access to adjuster shaft 68 for manual rotation of shaft 68 to back off tappets 62, 64 when replacing brake pads 32, 34. Assembly 118 is similar to assembly 54. Similar components of assemblies 54, 118 have the same reference numbers and a description to such components may be found above in the description of assembly 54. Assembly 118 differs from assembly 54 in that assembly 118 includes a housing 120 having three members 104', 106, 122.

Figure 8:
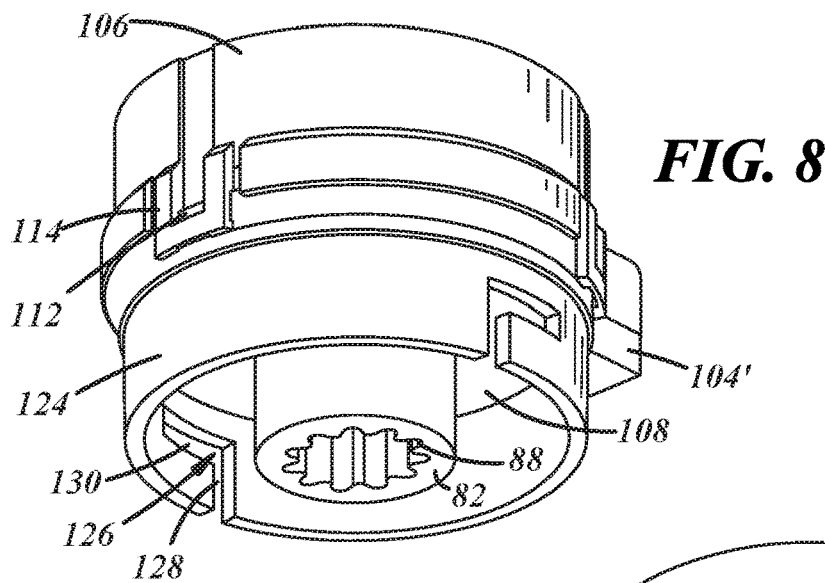
FIG. 8 is a perspective view of the wear sensor assembly of FIG. 7 with one member of the housing of the sensor assembly removed.

Member 104' is substantially similar to member 104 of housing 86 of assembly 54, but member 104' includes an additional axially extending inboard wall 124 (FIGS. 8 and 11) extending from wall 108 along axis 74 in an inboard direction towards caliper 38. Wall 124 is configured to engage member 122. Referring to FIG. 8, wall 124 includes one or more notches 126 for a purpose described below. In the illustrated embodiment, wall 124 includes a pair of notches 126 that are diametrically opposite one another. It should be understood, however, that the number of notches 126 may vary. Each notch 126 includes an axially extending portion 128 and a circumferentially extending portion 130. The axially extending portion 128 has an inboard end that extends from an inboard end of wall 124 and an outboard end from which the circumferentially extending portion 130 extends.

Figure 9:
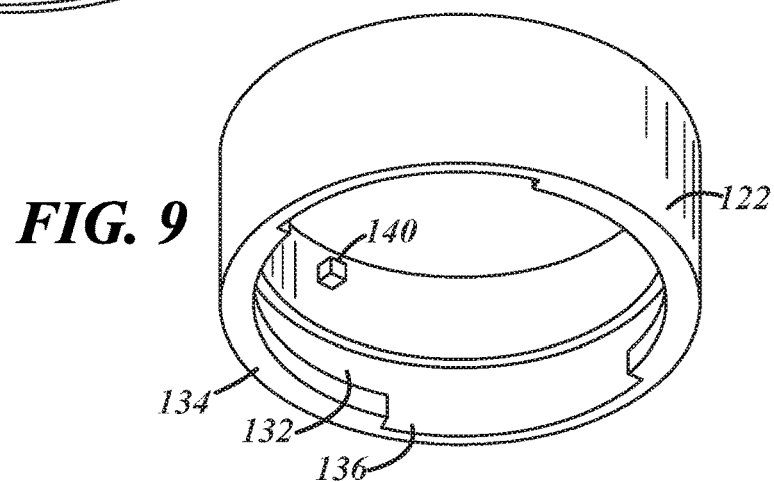
FIG. 9 is a perspective view of a portion of one member of the housing of the wear assembly of FIG. 7.
Figure 10:
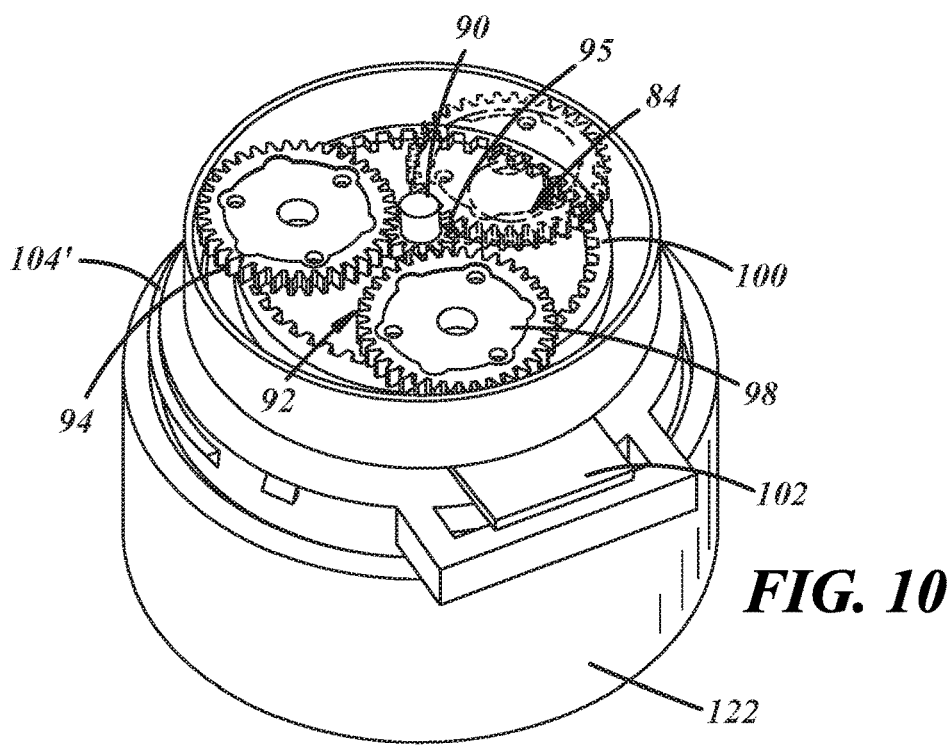
FIG. 10 is a perspective view of the wear sensor assembly of FIGS. 3-4 with one member of the housing of the sensor assembly removed.
Figure 11:
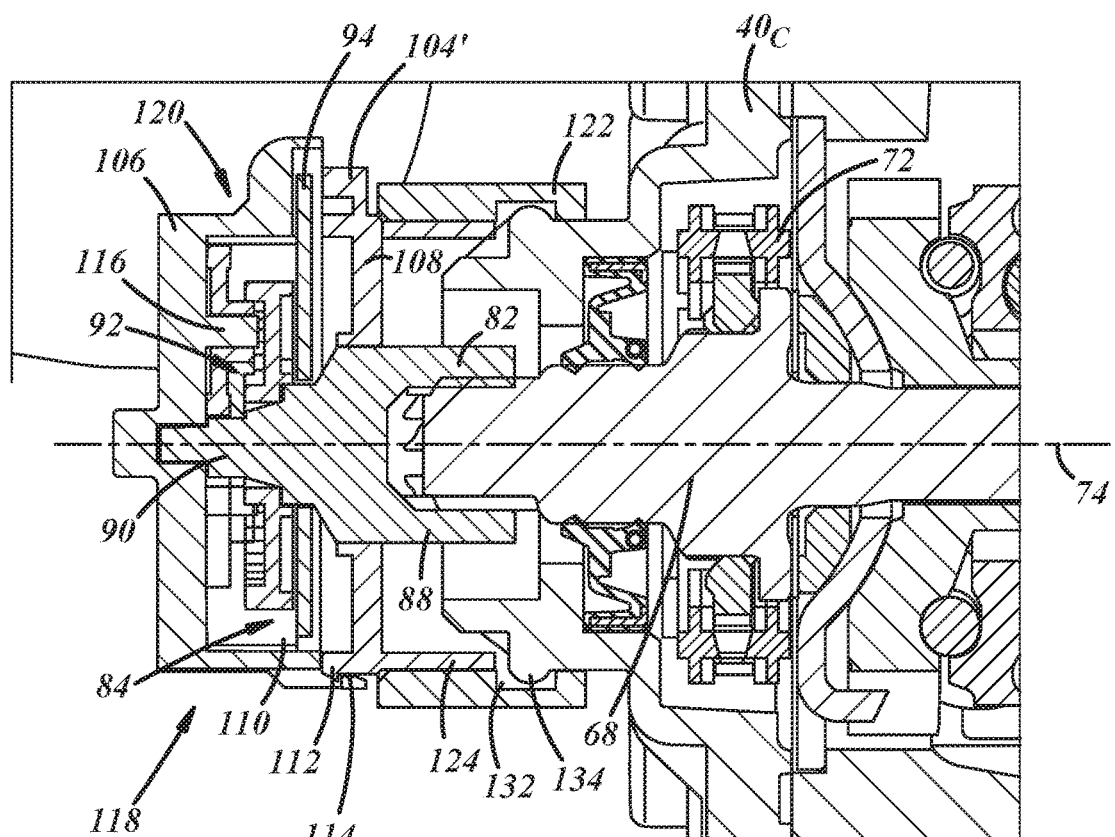
FIG. 11 is a cross-sectional view of the wear sensor assembly of FIGS. 7-10 mounted on the disc brake of FIGS. 1-2.

Referring to FIG. 11, member 122 is configured for mounting on caliper 38 such that member 122 surrounds the end of shaft 68 and the end of shaft extender 82 coupled to shaft 68. Member 122 is annular in shape and is configured to be disposed about axis 74 upon assembly to caliper 38. The inner diameter member 122 may vary to define a recess 132 configured to receive a portion of member 40c of body 40 of caliper 38. Referring to FIG. 9, member 122 may include a radially inwardly extending inboard end wall 134 at an inboard end having one or more arcuate gaps 136. Referring again to FIG. 11, gaps 136 permit inboard movement of member 122 relative to caliper 38 along the axis 74 upon alignment of gaps 136 with corresponding flanges 138 on member 40c of body 40 of caliper 38. Once wall 134 has passed the flanges 138, subsequent rotation of member 122 locates flanges 138 within recess 132 prohibiting movement of the member 122 relative to caliper 38 along axis 74. Referring again to FIG. 9, member 122 further includes one or more radially inwardly extending lugs 140 configured to be received within notches 126 on member 104'. During assembly of sensor assembly 118, member 104' is positioned relative to member 122 such that the axially extending portion 128 of notch 126 is aligned with a lug 140 in member 122 thereby permitting inboard movement of member 104' relative to member 122 along axis 74 until lug 140 reaches the outboard end of portion 128 of notch 126. Subsequent rotation of member 104' about axis 74 locates lug 140 within circumferentially extending portion 130 of notch 126 and inhibits movement of member 104' along axis 74.

Referring now to FIGS. 12-16, another embodiment of a wear sensor assembly 142 in accordance with the present teachings is illustrated. Like assemblies 54 and 118, assembly 142 is configured to determine an amount of wear pad on brake pads 32, 34 responsive to rotation of one of shafts 68, 70 in adjustment mechanism 52. Sensor assembly 142 may again be configured to be installed on caliper 38 in place of an existing cap or cover for adjuster shaft 68 that is removed to facilitate access to adjuster shaft 68 for manual rotation of shaft 68 to back off tappets 62, 64 when replacing brake pads 32, 34. Assembly 142 includes a shaft extender 144, a sensor 146, and a housing 148.

Figure 14:
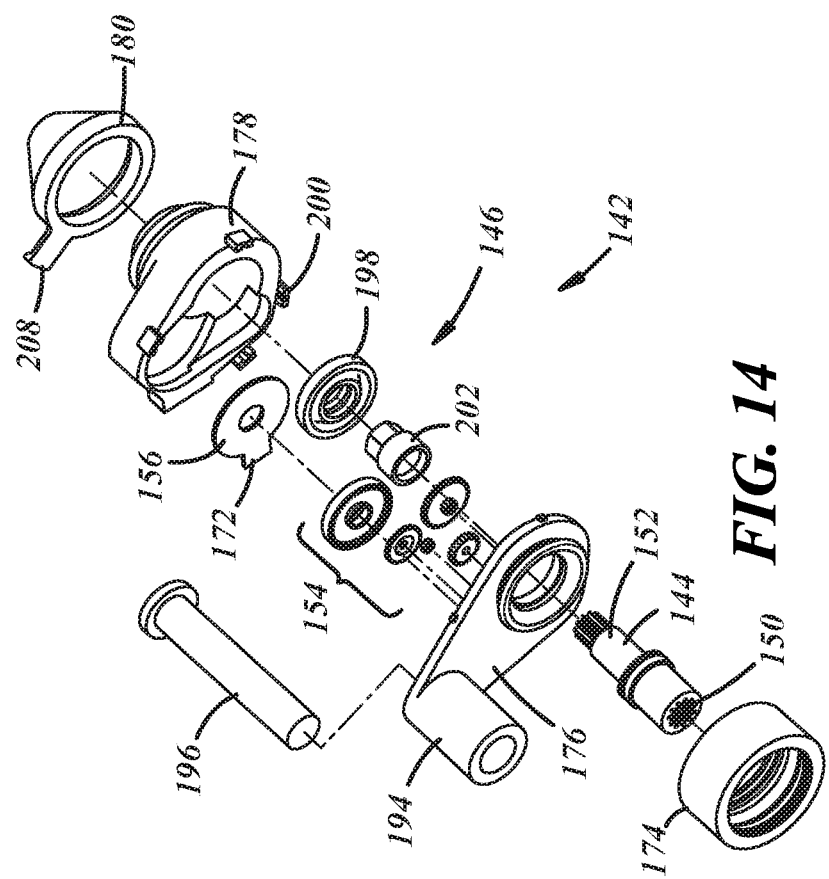
FIGS. 13-14 are exploded perspective views of the wear sensor assembly of FIG. 12.
Figure 16:
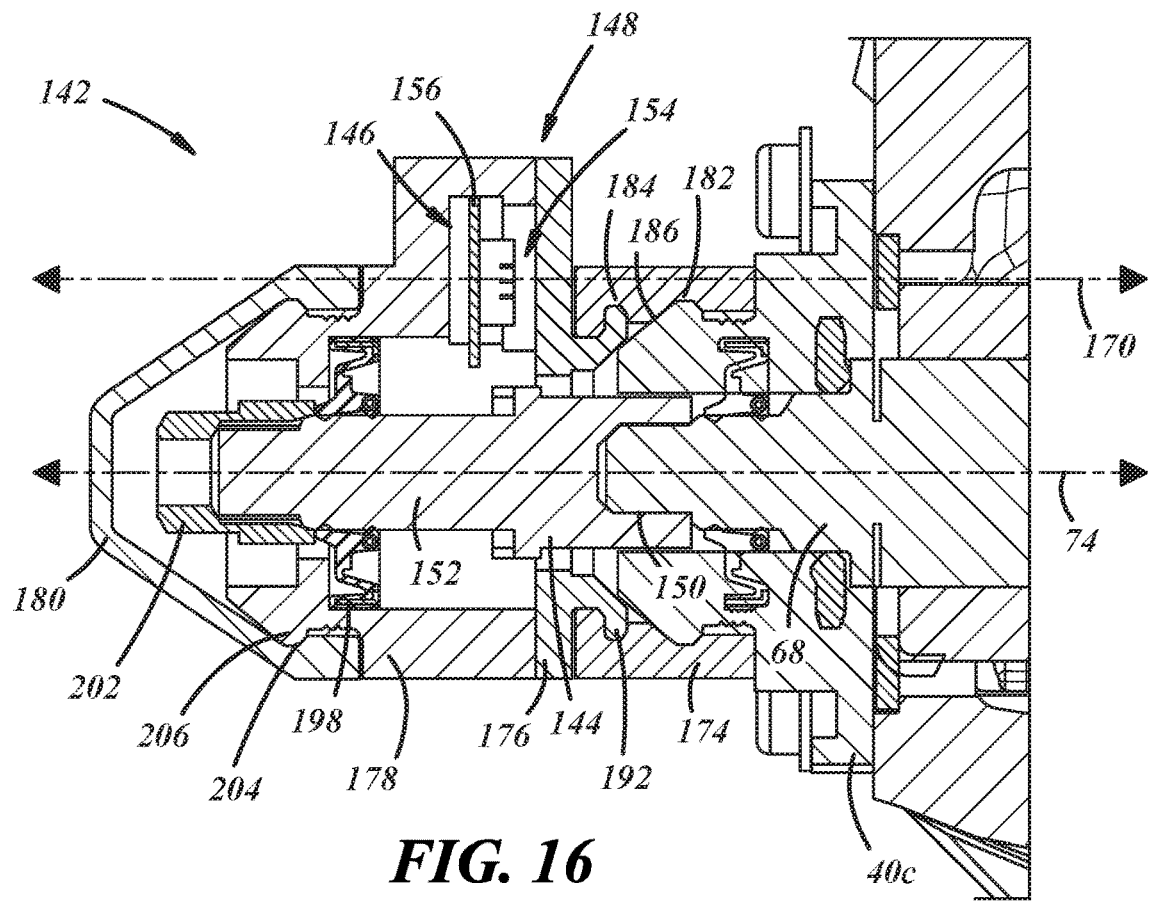
FIG. 16 is a cross-sectional view of the wear sensor assembly of FIG. 12 mounted on the disc brake of FIGS. 1-2.

Referring to FIG. 16, shaft extender 144 provides an extension of a shaft, such as shaft 68, in adjustment mechanism 52. Extender 144 is also configured to support components of sensor 146 and housing 148. One end of extender 144 is configured for coupling to one end of shaft 68. Although sensor assembly 142 is positioned such that extender 144 is coupled to one end of adjuster shaft 68 in the illustrated embodiment, it should again be understood that sensor assembly 142 could alternatively be positioned such that extender 144 is coupled to follower shaft 70. Referring to FIG. 14, in the illustrated embodiment extender 144 defines a recess 150 that is configured to receive an end of shaft 68. Recess 150 is configured to couple extender 144 to shaft 68 for rotation therewith about axis 74. Recess 150 may define a plurality of splines configured to engage corresponding splines on shaft 68. It should be understood, however, that recess 150 and the end of shaft 68 may be configured in a variety of complementary ways to couple extender 144 to shaft 68 for rotation about axis 74. The other end of extender 144 defines a shaft extension 152. Extension 152 is configured to support elements of sensor 146 and housing 148. Extender 144, and extension 152, rotate with shaft 68 such that rotation of extension 152 is indicative of the rotation of shaft 68 during adjustment of brake pads 32, 34 and, therefore, wear on brake pads 32, 34.

Sensor 146 is provided to generate a signal indicative of a degree of rotation of shaft extension 152. Because rotation of shaft extension 152 is indicative of rotation of shaft 68 which rotates to adjust the position of brake pads 32, 34 in response to wear on brake pads 32, 34, the signal is indicative of an amount of wear on brake pads 32, 34. Sensor 146 includes a body coupled to shaft extension 152 and configured for rotation in response to rotation of shaft extension 152 about axis 74 and a measurement device configured to generate the signal responsive to rotation of the body. In accordance with one embodiment, sensor 146 comprises a potentiometer in which the body rotating with shaft extension 152 comprises a member of a gear set 154 and the measurement device comprises a resistive element on a printed circuit board 156 whose resistance varies responsive to rotation of shaft extension 152 and gear set 154. It should be understood, however, that sensor 146 may assume other forms such as a Hall effect sensor, an encoder or resolver.

Figure 15:
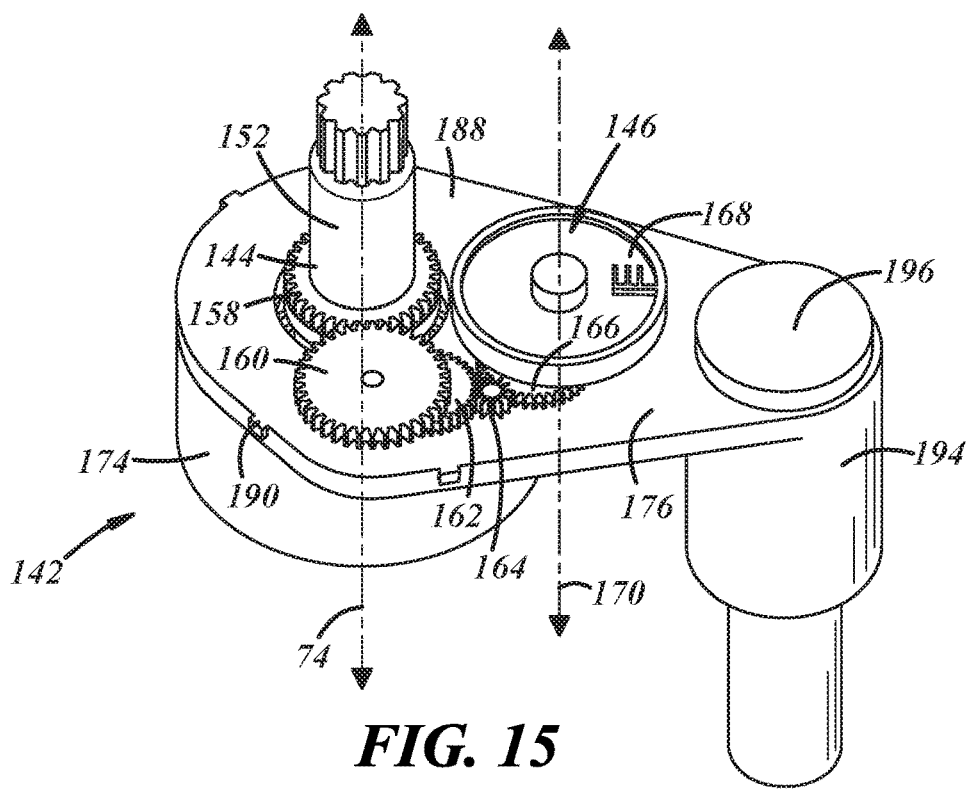
FIG. 15 is a perspective view of a portion of the wear sensor assembly of FIG. 12.

Gear set 154 provides a means for varying the level of resistance in the resistive element on board 156 responsive to rotation of shaft extension 152. Referring to FIG. 16, gear set 154 is disposed on an inboard side of board 156 and the resistive element unlike in sensor assemblies 54 and 118 (as used in connection with elements of sensor assembly 142 only, "inboard" refers to a location nearer to the end of shaft 68 and to body 40 of caliper 38 while "outboard" refers to a location further from the end of shaft 68 and body 40 of caliper 38). Referring to FIG. 15, gear set 154 may comprise a gear train including a pinion gear 158, several intermediate gears 160, 162, 164, 166 and a ring gear 168. Pinion gear 158 is disposed about, and coupled to, shaft extension 152 for rotation with shaft extension 152. Intermediate gear 160 includes a larger diameter outboard portion having a first set of teeth in mesh with teeth on pinion gear 158 and a small diameter inboard portion having a second set of teeth in mesh with teeth on intermediate gear 162. The teeth on intermediate gear 162 are also in mesh with teeth on intermediate gear 164 which are, in turn, in mesh with teeth on intermediate gear 166. Intermediate gear 166 has a larger diameter inboard portion with a first set of teeth in mesh with intermediate gear 164 and a small diameter outboard portion with a second set of teeth in mesh with teeth on ring gear 168. Ring gear 168 carries a pin or similar element that is in contact with the resistive element on board 156. Ring gear 168 therefore acts as a contact member for the potentiometer. Upon rotation of adjuster shaft 68 and shaft extender 144, rotation of shaft extension 152 is transmitted through pinion gear 158 and intermediate gears 160, 162, 164, 166 to ring gear 168 to vary the resistance of the resistive element on board 156 and thereby generate a signal indicative of the amount of wear on brake pads 32, 34. In accordance with one embodiment, gear set 154 is configured to generate one full (360 degree) rotation of ring gear 168 for twelve full (360 degree) rotations of adjuster shaft 68. Unlike in sensor assemblies 54, 118, ring gear 168 is configured for rotation about an axis 170 that is offset from, and may be parallel to, axis 74 for a purpose described hereinbelow.

Figure 13:
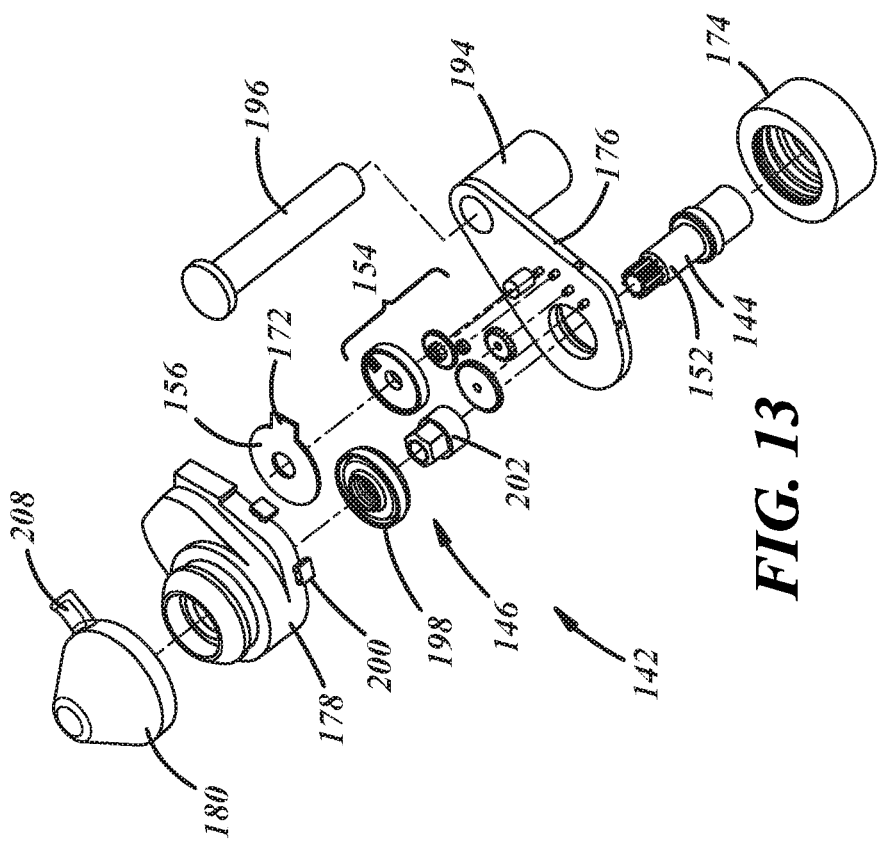

Board 156 provides support for the resistive element and electrically connects the resistive element with other electronic components on the board 156. The resistive element may be made from a material having a known resistivity and formed into a circle or arcuate segment on board 156. End terminals of the element may be connected to other electronic components on board 156 for transmitting a signal indicative of the degree of rotation of shaft extension 152 and shaft 68 and, therefore, wear on brake pads 32, 34. In some embodiments, these components may include a connector for wires used to transmit the signal to one or more systems within a vehicle including brake control systems and operator interface systems through which information about brake pad wear may be conveyed to vehicle operators (e.g., through audio, visual, or haptic indicators). In other embodiments, the components may include a wireless transceiver configured to transmit the signal to such systems and/or to other systems remote from the vehicle. The operator interface system may, in some embodiments, permit an operator to input a value indicative of the thickness of rotor 24 following a change in brake pads 32, 34 to provide a more accurate estimate of the life of brake pads 32, 34 to the operator. In particular, wear occurs on the surfaces of rotor 24 as well as brake pads 32, 34. Absent an input indicative of the thickness of rotor 24 (and the wear on rotor 24), a wear measurement system must assume that all of the movement of adjuster shaft 68 measured by sensor assembly 142 results from wear on brake pads 32, 34 to avoid the risk of the pads 32, 34 completing wearing through. This assumption, however, means that replacement/maintenance on brake pads 32, 34 may be performed prematurely. Inputting an indication of the thickness of rotor 24 will allow systems utilizing outputs from sensor assembly 142 to determine the wear on brake pads 32, 34 with greater accuracy. Signals transmitted from board 156 (whether through wires or wirelessly) may include information sufficient to identify the particular wheel assembly on which the brake 26 is mounted to facilitate location of particular brake pads 32, 34 requiring maintenance. In the illustrated embodiment, board 156 is generally annular in shape. Referring to FIG. 16, unlike in sensor assemblies 54, 118, board 156 is configured to be received within housing 148 such that a center of board 156 is disposed about an axis 170 axially offset from axis 74 for a purpose described below. Referring to FIGS. 13-14, board 156 may define a radially outwardly projecting tab 172 configured to interact with housing 148 to prevent rotation of board 156 about axis 170.

Figure 12:
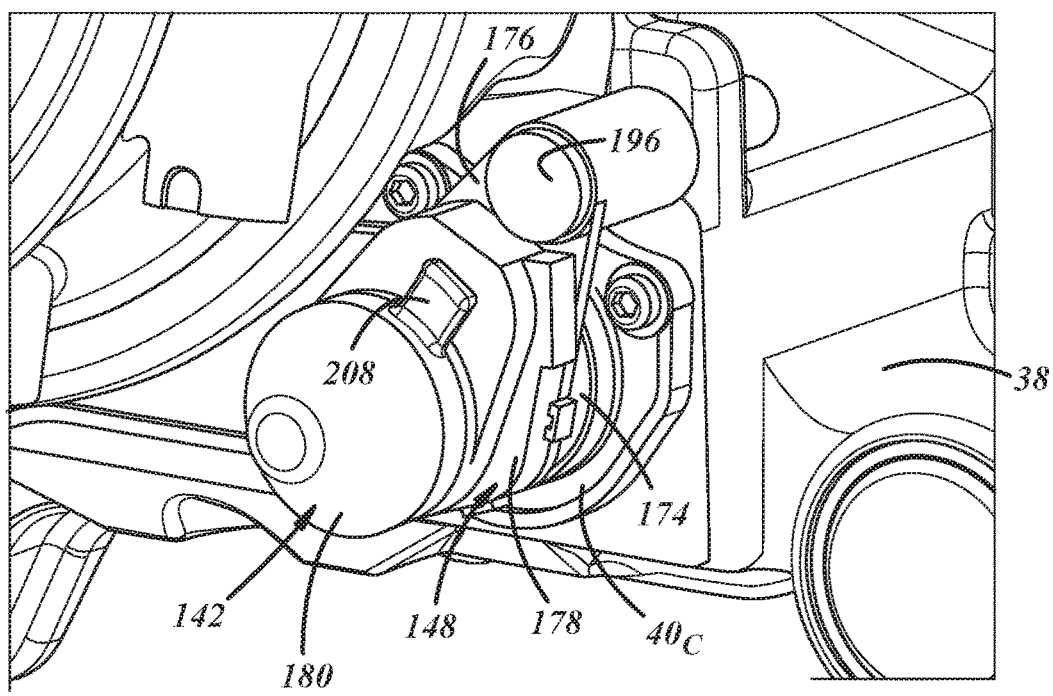
FIG. 12 is a perspective view of another embodiment of a wear sensor assembly for determining an amount of wear on a brake pad of the disc brake of FIGS. 1-2 mounted on the disc brake of FIGS. 1-2

Referring to FIG. 12, housing 148 is provided to support and orient the components of sensor 146 and to protect sensor 146 and components of adjustment mechanism 52 from foreign objects and elements. Housing 148 may include multiple members 174, 176, 178, 180.

Referring to FIG. 16, member 174 is configured for mounting on caliper 38 such that member 174 surrounds the end of shaft 68 and the end of shaft extender 144 coupled to shaft 68. Member 174 may be made from an elastomer such as rubber. Member 174 is annular in shape and is configured to be disposed about axis 74 upon assembly to caliper 38. The inner diameter member 174 varies to define grooves 182, 184 configured to receive a portion of member 40c of body 40 of caliper 38 and a portion of member 176 of housing 148. During assembly, member 174 is pressed over the end of member 176 such that member 176 is disposed within groove 184. Thereafter, the sensor assembly 142 is mounted as a unit onto caliper body 38 by moving sensor assembly 142 along axis 74. Member 174 deforms outward and assumes a stressed state as member 174 slides over a cam surface 186 on member 40c of body 40 of caliper 38 and then returns to an unstressed state once the cam surface 186 enters groove 182 to inhibit movement of sensor assembly 142 relative to caliper body 38 along axis 74.

Member 176 is configured to support gear set 154, board 156 and components of board 156 including the resistive element. Referring to FIG. 15, member 176 includes a radially extending wall 188 that is disposed about axes 74 and 170 and through which shaft extender 152 extends. Wall 188 includes an inboard side configured to face caliper 38 and an outboard side configured to face away from caliper 38. Wall 188 includes a plurality of radially outwardly ending lugs 190 for a purpose described below. Referring to FIG. 16, member 176 further includes an axially extending wall extending from wall 188 along axis 74 in an inboard direction towards caliper 38 that terminates in an annular flange 192 configured to be received within groove 184 in member 174 of housing 148. Referring to FIGS. 13-14, member 176 further includes an axially extending tubular portion 194 extending from wall 188 in an inboard direction towards caliper 38. Portion 194 defines a bore configured for alignment with a corresponding bore in body 40 of caliper 38 that may be used to route wires from conventional brake pad wear sensors. A fastener 196 may extend through the bore in portion 194 and the bore in body 40 of caliper 38 and may extend in a direction parallel to axes 74, 170. Fastener 196 may couple sensor assembly 142 to caliper 38 and precisely orient sensor assembly 142 in order to calibrate sensor assembly 142. Member 176 is configured to position and orient elements of sensor 146 including gear set 154 and board 156 such that sensor 146 is offset from axis 74. In particular, member 176 positions and orients gear set 154 and board 156 such that ring gear 168 and board 156 are offset from axis 74 and such that ring gear 168 rotates about an offset axis 170 that if offset from, and may be parallel to, axis 74. By locating the sensor 146 such that the primary components of the sensor 146 are offset from axis 74, access to shaft 68 is maintained for manual adjustment of the shaft 68 to back off tappets 62, 64 when replacing brake pads 32, 34.

Member 178 is configured to enclose the components of sensor 146 including gear set 154 and board 156. Referring to FIG. 16, member 178 is annular in shape and configured to allow shaft extension 144 to extend therethrough. Member 178 is configured to house a seal 198 that may be disposed about shaft extension 144. Referring to FIGS. 13-14, member 178 may include a plurality of deformable tabs 200 extending from an inboard end of member 178 and in an inboard direction and configured to engage lugs 190 on member 176 to couple members 176, 178 together and enclose sensor 146. Together with member 176, member 178 is configured to position and orient elements of sensor 146 such that sensor 146 is offset from axis 74. In particular, member 178 positions and orients gear set 154 and board 156 such that ring gear 168 and board 156 are offset from axis 74 and ring gear 168 rotates about offset axis 170. Again, by locating the sensor 146 such that the primary components of the sensor 146 are offset from axis 74, access to shaft 68 for manual adjustment of the shaft 68 to back off tappets 62, 64 when replacing brake pads 32, 34 is maintained. Member 178 has a shape that is, in part, complementary to board 156 such that member 178 is configured to receive tab 172 of board 156 to prevent rotation of board 156 and the resistive element about axis 170 and movement of board 156 and the resistive element along axis 170.

Member 180 is provided to enclose the end of shaft extender 144 and a shear adapter 202 that may be mounted to shaft extension 152 of shaft extender 144 and that may be engaged by a tool for use in manual adjustment of adjuster shaft 68. Member 180 provides access to shear adapter 202 to allow for manual adjustment of adjuster shaft 68 to back off tappets 62, 64 for replacement of brake pads 32, 34. In accordance with the teachings disclosed herein, adjustment of shaft 68 is possible without removing or dislodging sensor 142 thereby facilitating more rapid replacement of brake pads 32, 34 and reducing the potential for damage to sensor 142. Member 180 may be made from an elastomer such as rubber. Referring to FIG. 16, member 180 may be conical in shape and is configured to be disposed about axis 74 upon assembly of sensor assembly 142 to caliper 38. The inner diameter member 180 varies to define a groove 204 configured to receive a portion of member 178 of housing 148. During assembly, member 180 is pressed over the end of member 178 and deforms outward and assumes a stressed state as member 180 slides over a cam surface 206 on member 178 and then returns to an unstressed state once the cam surface 206 enters groove 204 in order to inhibit further movement of member 180 relative to member 178 along axis 74. Referring to FIG. 12, member 180 may include a radially outwardly extending tab 208 that can be grasped by a user to deform member 180 and pull member 180 off of member 178 to allow access to shear adapter 202.

Referring again to FIG. 16, a method of assembling a sensor assembly 142 for determining an amount of wear on a brake pad 32, 34 in a disc brake 26 to the disc brake 26 may begin with the step of removing a cap (not shown) that is normally affixed to member 40c of body 40 of caliper 38 and that covers a shaft, such as shaft 68, of adjustment mechanism 52. Thereafter, the method may continue with the step of rotating the shaft 68 about a rotational axis 74 to position the shaft 68 at a predetermined position. In particular, shaft 68 may be rotated to fully retract tappets 62, 64 and, therefore, brake pads 32, 34, from rotor 24. Shaft 68 may be rotated in a conventional manner by inserting a tool into a shear adapter 202 that is mounted on the end of shaft 68. Once the shaft 68 has been rotated to position the shaft 68 at the predetermined position, the shear adapter 202 may be removed from the end of shaft 68. Referring to FIG. 12, the method may continue with the step of inserting an alignment tool (not shown) through the bore in body 40 of caliper 38 that will subsequently be aligned with the bore in the tubular portion 194 of member 176 of housing 148. The alignment tool may comprise a pin or rod having a shaft similar to fastener 196. The method may continue with the step of aligning sensor assembly 142 with disc brake 26. Sensor assembly 142 is pre-assembled with shaft extender 144, sensor 146 and housing 148 already having been assembled together at an earlier point in time (although member 180 of housing 148 may be uncoupled from member 178 prior to the aligning step). The bore in tubular portion 194 of member 176 may be aligned with the bore in body 40 of caliper 38 such that the bore in tubular portion 194 is positioned to receive a portion of the alignment tool extending through the bore in body 40 of caliper 38. Referring again to FIG. 16, the method may continue with the step of moving sensor assembly 142 along axis 74 in an inboard direction relative to caliper 38. During this movement, the following actions occur: (i) member 174 of housing 148 engages cam surface 186 in member 40c of body 40 of caliper 38 and deflects outward until the cam surface 186 is received within groove 182 at which point member 174 returns to its unstressed state to seat housing 148 on member 40c of caliper 38 such that housing 148 surrounds the end of shaft 68; (ii) recess 150 in shaft extender 144 slides onto the end of shaft 68; and (iii), referring to FIG. 12, the alignment tool is inserted through the bore in tubular portion 194 of member 176 of housing 148. Once the sensor assembly 142 is properly positioned relative to caliper 38, the method may continue with the steps of removing the alignment tool from the bores in body 40 of caliper 138 and tubular portion 194 of member 176 of housing 148 and installing fastener 196 through the bores. Referring again to FIG. 16, the method may continue with the steps of installing shear adapter 202 onto shaft extension 152 of shaft extender 144. As discussed above, in accordance with one aspect of the present teachings, the sensor 146 of sensor assembly 142 is offset from axis 74. As a result, shear adapter 202 can be used in a conventional manner to adjust the position of adjuster shaft 68 and brake pads 32, 34 without removal of sensor 146. The method may conclude with the step of enclosing shear adapter 202 by coupling member 180 of housing 148 to member 178. As discussed above, member 180 may be moved in an inboard direction along axis 74 and deflect outwardly as an inboard end of member 180 engages cam surface 206 on member 178 of housing 148. Member 180 will return to an unstressed state once the cam surface 206 enters groove 204 and will remain seated on member 178 absent a sufficient external force applied to member 180 (e.g., by pulling on tab 208 of member 180).

A sensor assembly 54, 118 or 142 for determining an amount of wear on a brake pad 32, 34 in a disc brake 26 in accordance with the invention represents an improvement as compared to conventional brake pad wear sensors. Unlike conventional sensors that are embedded in brake pads, a sensor 54, 118 or 142 in accordance with the present disclosure does not require replacement each time the brake pad 32, 34 is replaced. Further, unlike conventional position sensors, a sensor 54, 118 or 142 in accordance with the present disclosure is mounted in a location where damage is less likely to occur and is configured in such a way that the sensor can be easily accessed for repair or replacement and can be installed on existing brake calipers.

While the invention has been shown and described with reference to one or more particular embodiments thereof, it will be understood by those of skill in the art that various changes and modifications can be made without departing from the spirit and scope of the invention.

What is claimed is:

1. A sensor assembly for determining an amount of wear on a brake pad in a disc brake, comprising:
   a shaft extender including a first end configured for coupling to one end of a shaft of an adjustment mechanism of a caliper of the disc brake for rotation with the shaft about a rotational axis, a second end of the shaft extender defining a shaft extension;
   a sensor configured to generate a signal indicative of a degree of rotation of the shaft extension, the signal indicative of the amount of wear on the brake pad, the sensor including
      a body coupled to the shaft extension and configured for rotation about an offset axis offset from the rotational axis in response to rotation of the shaft extension about the rotational axis; and,
      a measurement device configured to generate the signal responsive to rotation of the body about the offset axis; and,
   a housing configured to enclose the sensor
   further comprising a shear adapter supported on the shaft extension and configured to be grasped by a tool to impart rotation to the shaft extender and shaft.

2. A sensor assembly for determining an amount of wear on a brake pad in a disc brake, comprising:
   a shaft extender including a first end configured for coupling to one end of a shaft of an adjustment mechanism of a caliper of the disc brake for rotation with the shaft about a rotational axis, a second end of the shaft extender defining a shaft extension;
   a sensor configured to generate a signal indicative of a degree of rotation of the shaft extension, the signal indicative of the amount of wear on the brake pad, the sensor including
      a body coupled to the shaft extension and configured for rotation about an offset axis offset from the rotational axis in response to rotation of the shaft extension about the rotational axis; and,
      a measurement device configured to generate the signal responsive to rotation of the body about the offset axis; and,
   a housing configured to enclose the sensor
   wherein the sensor comprises a potentiometer including a pin extending from the body and contacting a resistive element of the measurement device supported within the housing.

3. The sensor assembly of claim 2 wherein the shaft comprises an adjuster shaft of the adjustment mechanism.

4. The sensor assembly of claim 2 wherein the offset axis is parallel to the rotational axis.

5. The sensor assembly of claim 2 wherein the measurement device includes a printed circuit board on which the resistive element is disposed, the printed circuit board centered about the offset axis and defining a tab configured to be received by the housing to inhibit rotation of the printed circuit board about the offset axis.

6. The sensor assembly of claim 2 wherein the body comprises a ring gear driven by a gear train including a pinion gear coupled to the shaft extension for rotation with the shaft extension.

7. The sensor assembly of claim 2 wherein the housing includes
   a first member including a radially extending wall disposed about the rotational axis and through which the shaft extender extends, the radially extending wall having an inboard side configured to face the caliper and an outboard side configured to face away from the caliper; and,
   a second member configured to engage the first member of the housing and enclose the sensor on the outboard side of the radially extending wall of the first member of the housing.

8. The sensor assembly of claim 7 wherein the housing includes a third member configured for coupling to the first member of the housing on the inboard side of the radially extending wall of the first member of the housing and for mounting on the caliper such that the third member surrounds the end of the shaft and the first end of the of the shaft extender.

9. The sensor assembly of claim 7 wherein the housing includes a third member configured for coupling to the second member of the housing to enclose the shaft extension of the shaft extender.

10. The sensor assembly of claim 7 wherein the first member of the housing includes a radially extending flange having a bore configured for alignment with a bore in the caliper and configured to receive a fastener extending through the bore in the caliper.

11. The sensor assembly of claim 10 wherein the fastener is inserted through the bore in the flange of the first member of the housing and the bore in the caliper in a direction parallel to the rotational axis.

12. A method of assembling a sensor assembly for determining an amount of wear on a brake pad in a disc brake to the disc brake, comprising the steps of:
   rotating a shaft of an adjustment mechanism of a caliper of the disc brake about a rotational axis to position the shaft at a predetermined position;
   aligning the sensor assembly with the disc brake, the sensor assembly including a shaft extender including a first end configured for coupling to one end of the shaft of the adjustment mechanism for rotation with the shaft about the rotational axis and a second end defining a shaft extension, a sensor configured to generate a signal indicative of a degree of rotation of the shaft extension, the signal indicative of the amount of wear on the brake pad, the sensor including a body coupled to the shaft extension and configured for rotation about an offset axis offset from the rotational axis in response to rotation of the shaft extension about the rotational axis and a measurement device configured to generate the signal responsive to rotation of the body about the offset axis, the sensor assembly further including a housing configured to enclose the sensor;

moving the sensor assembly along the rotational axis relative to the caliper such that the shaft extender of the sensor assembly is coupled to the one end of the shaft of the adjustment mechanism; and installing a shear adapter onto the shaft extension of the shaft extender of the sensor assembly.

13. The method of claim 12 wherein, during the alignment step, a bore in the housing is aligned with a bore in the caliper and further comprising the step of installing a fastener through the bore in the housing and the bore in the caliper.

14. The method of claim 13, further comprising the step of inserting an alignment tool into the bore in the caliper prior to the aligning step and wherein the moving step includes inserting the alignment tool through the bore in the housing.

15. The method of claim 14, further comprising the step of removing the alignment tool from the bore in the caliper and the bore in the housing of the sensor assembly after the moving step and before the installing step.

16. The method of claim 12, further comprising the step of enclosing the shear adapter within the housing after the installing step.

17. The method of claim 12 wherein the moving step includes the substep of seating the housing of the sensor assembly on the caliper such that the housing surrounds the end of the shaft.

18. The method of claim 12 wherein the shaft comprises an adjuster shaft of the adjustment mechanism.

19. The method of claim 12 wherein the offset axis is parallel to the rotational axis.

* * * * *